United States Patent
Lanzilli

(10) Patent No.: US 6,546,845 B1
(45) Date of Patent: Apr. 15, 2003

(54) COLLAPSIBLE ROTISSERIE AND GRILL AND OVEN COMBINATION

(76) Inventor: Joseph A. Lanzilli, P.O. Box 8243, San Jose, CA (US) 95155

( * ) Notice: Subject to any disclaimer, the term of this patent is extended or adjusted under 35 U.S.C. 154(b) by 0 days.

(21) Appl. No.: 10/122,932

(22) Filed: Apr. 13, 2002

(51) Int. Cl.[7] .......................... A47J 37/00; A47J 37/04; A47J 37/07

(52) U.S. Cl. .............................. 99/339; 99/340; 99/419; 99/421 H; 99/448; 99/449; 126/9 R; 126/25 R

(58) Field of Search .......................... 99/331, 339, 340, 99/352, 355, 400, 401, 419–421 V, 444–450, 481, 482; 126/9 R, 25 R; 219/400, 401

(56) References Cited

U.S. PATENT DOCUMENTS

| | | | | |
|---|---|---|---|---|
| 3,126,814 A | * | 3/1964 | Brown | 99/421 H |
| 3,230,948 A | * | 1/1966 | Schmitt | 99/419 X |
| 5,172,628 A | * | 12/1992 | Pillsbury et al. | 99/421 A |
| 5,184,540 A | * | 2/1993 | Riccio | 126/25 R |
| 5,333,540 A | * | 8/1994 | Mazzocchi | 99/446 X |
| 5,367,950 A | * | 11/1994 | Sarich | 99/449 X |
| 5,421,318 A | * | 6/1995 | Unruh et al. | 126/9 R |
| 5,485,780 A | * | 1/1996 | Koether et al. | 219/400 X |
| 5,562,022 A | * | 10/1996 | Schmid et al. | 99/419 X |
| 5,715,744 A | * | 2/1998 | Coutant | 99/421 R |
| 5,799,569 A | * | 9/1998 | Moreth | 99/446 X |
| 5,934,180 A | * | 8/1999 | Lin | 99/340 |
| 6,131,505 A | * | 10/2000 | Lin | 99/340 |

* cited by examiner

Primary Examiner—Timothy F. Simone

(57) ABSTRACT

A collapsible rotisserie and grill and oven accessory is provided for use with a cooking appliance. The collapsible rotisserie and grill and oven accessory can bake and grill and utilize a rotisserie simultaneously. The collapsible rotisserie and grill and oven accessory comprises folding side panels and a folding rear panel, a front panel that removably engages to the side panels and side panels including apetures adapted for receiving a spit therethrough. The collapsible rotisserie and grill and oven accessory can be disassembled into a compact portable carrying structure.

3 Claims, 2 Drawing Sheets

COLLAPSIBLE ROTISSERIE AND GRILL AND OVEN COMBINATION

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

This invention relates generally to the field of cooking products and more particularly to a collapsible rotisserie and grill and oven accessory freely moveably mounted atop a cooking appliance.

Ovens and rotisserie accessories are generally well known in the prior art. Skewered food cooking apparatus such as that disclosed in U.S. Pat. Nos. 4,598,690; 4,815,367; 5,172,628; 6,021,708 and grill and oven combinations such as U.S. Pat. No. 5,437,227 are functional for their intended purpose.

While these devices fulfill their respective, particular objective and requirements, the aforementioned patents do not describe a collapsible rotisserie and grill and oven accessory that allows a variety of foods to be cooked simultaneously, collapses for compact storage and modifies cooking temperature with a removably engaged front panel.

The present invention includes a frame wherein folding side panels are hingedly attached to a hinged rear panel, and a front panel removably engaging said side panels. The side panels include opposing apetures to support a rotating spit or rotisserie. The side panels include an upper portion configured to receive a cooking grate.

As such, the collapsible rotisserie and grill and oven accessory substantially departs from the conventional concepts and designs of the prior art.

BRIEF SUMMARY OF THE INVENTION

The general purpose of the present invention, which will be described subsequently in greater detail, is to provide a new and improved portable rotisserie and grill and oven accessory adaptable to bake and grill and utilize a rotisserie simultaneously, to fold flat for storage and to modify cooking temperature utilizing a removably engaged front panel.

To attain this, the present invention generally comprises a frame wherein folding side panels are hingedly attached to a hinged rear panel, and a front panel removably engaging said side panels. The front panel can be attached or removed from side panels to modify cooking temperature. The side panels and the rear panel can be folded nearly flat for storage. The side panels include opposing apetures to support a rotating skewer or rotisserie. The skewer or rotisserie can be driven by an electric motor. The side panels include an upper portion configured to receive a cooking grate for baking. The present invention provides for use of the original cooking grate attached to the cooking appliance upon which the present invention is mounted, maintaining a surface for grilling.

It is to be understood that the invention is not limited in its arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, one major object of the present invention is to provide a new collapsible rotisserie and grill and oven accessory adaptable to bake and grill and utilize a rotisserie simultaneously.

Another object of the present invention is to provide a collapsible rotisserie and oven accessory that can be folded nearly flat into a small, easily stored and transported unit that fits within commercially available portable table top grills.

A further object of the present invention is to provide a collapsible rotisserie and grill and oven accessory wherein cooking temperature can be modified by removing or attaching the front panel.

Yet another object of the present invention is to provide a collapsible rotisserie and grill and oven accessory that maintains the use of the cooking grate provided with the cooking appliance upon which the present invention is movably mounted.

A still further object of the present invention is to provide a collapsible rotisserie and grill and oven accessory that is inexpensive, dependable and fully effective in accomplishing its intended purpose.

These and other objects of the present invention will become readily apparent upon further review of the following specification and drawing.

DETAILED DESCRIPTION OF THE INVENTION

Figure 1:
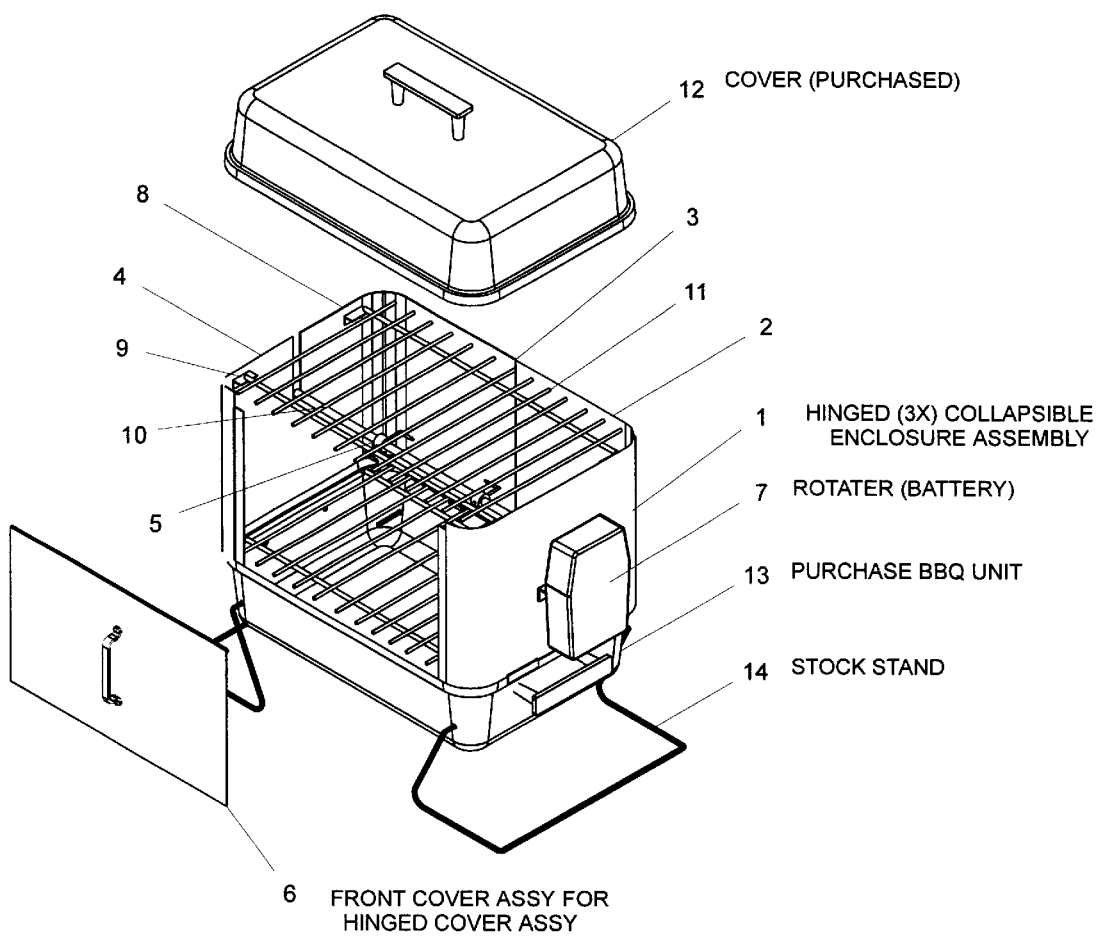
FIG. 1 is a perspective view of an example of the present invention, depicting the side panels, front and rear panels and drive assembly. Also shown is a typical portable grill.

FIG. 1 is a perspective view of the present invention in an open, use or cooking position. The present invention is particularly adapted for use with a portable barbecue grill, generally designated 13. The cover of portable barbecue designated as 12. The collapsible rotisserie and grill and oven combination includes first and second side panels, generally designated as 1 and 4, hingedly attached to a rear panel 2. Said rear panel is bisected by a central hinge 3 that collapses forward for flat storage. Second side panel 4 has a slot downwardly extending from an upper edge of the side panel. The slot is adapted for receiving a spit 10 therein. First side panel 1 has a first apeture adapted for receiving the spit therethrough. A pair of holding forks 5 can be coupled to the spit for coupling food to the spit.

In addition, the collapsible rotisserie and grill and oven combination has a pair of short brackets extending inward from the upper edge of side panels 1 and 4. These short brackets are illustrated as 8 and 9 on side panel 4 and are adapted to support a cooking grate 11.

A front panel 6 removably engages side panels 1 and 4. Preferably, each of the corners between the side panels 1 and 4 and the rear panel 2 of the present invention are curved to generally match the curvature of the outer edge of the grill to diminish heat loss between the invention and the grill. Dimensions of a collapsible rotisserie and grill and oven combination mountable to a typical portable grill are 17.47 inches long and 10.88 inches wide and 9.7 inches high.

Ideally, an electric drive assembly 7 rotates the spit. The drive assembly is mounted to the first side panel 1 and is coupled to the spit 10. The drive assembly 7 includes an electrical storage battery and an an/off switch, selectively connecting the battery to the drive assembly.

In use, the collapsible rotisserie and grill and oven combination is rested on the outer periphery of a form fitting grill or rested on the grate of a grill of a non form fitting model. Front panel 6 can be engaged to side panels 1 and 4 for hotter cooking. Lower cooking temperatures can be achieved by removing front panel 6.

Figure 2:
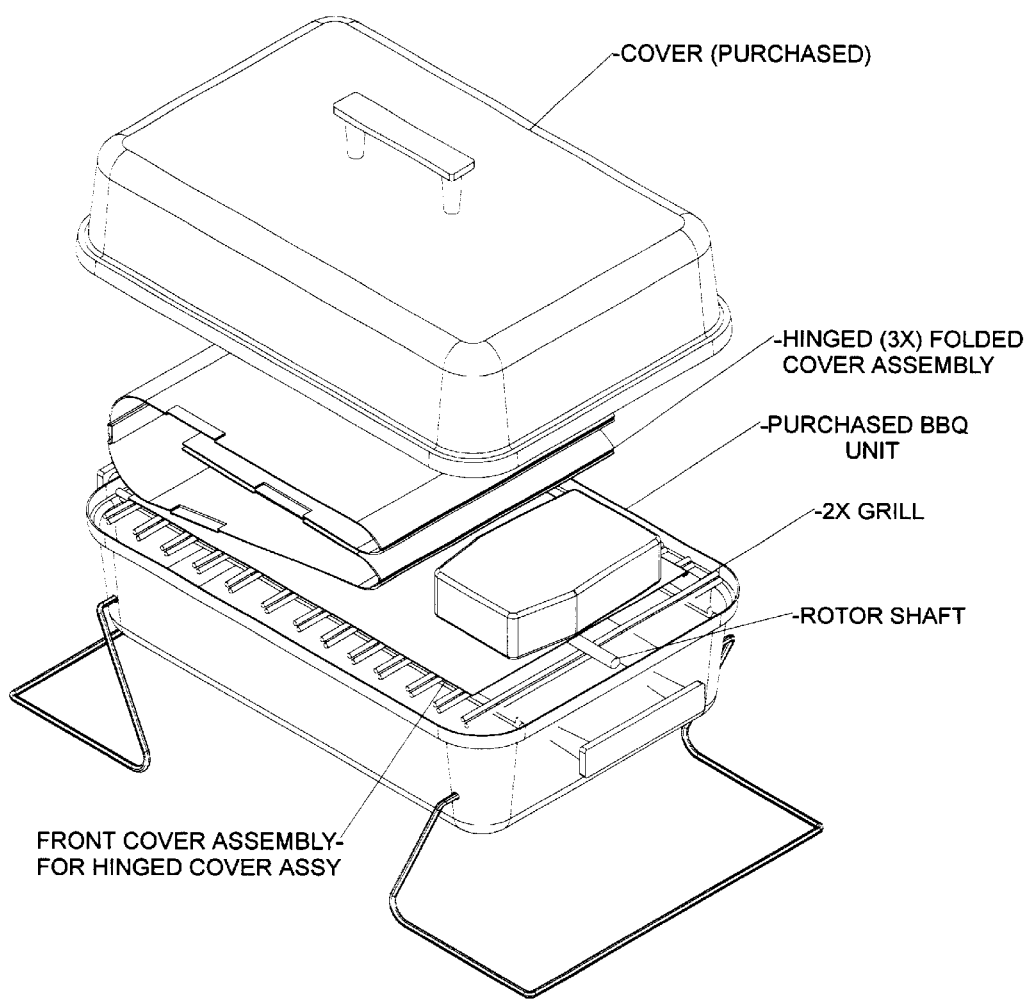
FIG. 2 is a perspective view of the present invention in a closed position.

For storage the center of rear panel 2 folds forward at hinge 3. Side panels 1 and 4 fold flat against folded rear panel 2. FIG. 2 is a perspective view of the present invention illustrating the collapsible rotisserie and grill and oven accessory in a closed or transporting position stored within a commercially available portable barbecue grill.

It is to be understood that the present invention is not limited to the sole embodiments described above, but encompasses any and all embodiments within the scope of the following claims.

I claim:

1. A collapsible rotisserie and grill and oven accessory for mounting atop a cooking appliance comprising:

a free standing frame for resting atop a cooking appliance having an open top and an open bottom;

said frame having a first and a second side panel hingedly mounted to a rear panel;

a rear panel bisected from the top edge to the bottom edge by a hinge;

a front panel removably engaging said first side panel and said second side panel;

a first aperture positioned towards the center of said first panel, said first aperture adapted for receiving a spit therethrough;

a second aperture positioned towards the center of said second panel, said second aperture adapted for receiving a spit therethrough;

a spit being inserted through said first aperture of said first panel and resting in said aperture of said second panel;

a drive assembly for rotating a spit, said drive assembly mounted to outside wall of first side panel;

a plurality of short brackets inwardly positioned towards the upper edge of said first side panel and the upper edge of said second side panel, removably engaging a cooking grate;

whereby the collapsible rotisserie and grill and oven accessory can simultaneously bake and grill and roast food on a rotisserie.

2. The apparatus of claim 1, wherein said drive assembly includes an electrical storage battery and an on/off switch, selectively connecting said battery to electric drive motor through said switch.

3. The apparatus of claim 1, including a handle located on the exterior of the front panel for manually engaging and disengaging front panel from said side panels.

* * * * *